United States Patent
Barnes et al.

(10) Patent No.: US 8,509,963 B1
(45) Date of Patent: Aug. 13, 2013

(54) REMOTE MANAGEMENT OF AIRCRAFT COMPUTER SYSTEMS

(75) Inventors: Geoffrey J. Barnes, Cedar Rapids, IA (US); Richard G. Moore, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 922 days.

(21) Appl. No.: 12/460,681

(22) Filed: Jul. 23, 2009

(51) Int. Cl.
*G06F 11/30* (2006.01)

(52) U.S. Cl.
USPC .......... 701/2; 701/3; 701/14; 701/29.1; 701/29.3; 701/29.6; 701/29.9; 701/30.5; 701/30.9; 701/31.4; 701/31.5; 701/31.6; 701/31.8; 701/32.3; 340/945; 340/963; 340/540

(58) Field of Classification Search
None
See application file for complete search history.

(56) References Cited

U.S. PATENT DOCUMENTS

| | | | |
|---|---|---|---|
| 4,788,531 A * | 11/1988 | Corwin et al. .............. 340/945 |
| 6,067,486 A | 5/2000 | Aragones |
| 6,260,048 B1 | 7/2001 | Carpenter |
| 6,278,913 B1 * | 8/2001 | Jiang .............................. 701/3 |
| 6,353,734 B1 * | 3/2002 | Wright et al. ................. 455/98 |
| 6,385,513 B1 * | 5/2002 | Murray et al. ................ 701/14 |
| 6,487,479 B1 | 11/2002 | Nelson |
| 6,529,620 B2 | 3/2003 | Thompson |
| 6,550,055 B1 | 4/2003 | Cohen |
| 6,574,537 B2 | 6/2003 | Kipersztok-weston |
| 6,647,356 B2 | 11/2003 | Pierro |
| 6,654,673 B2 | 11/2003 | Ferguson et al. |
| 6,671,593 B2 | 12/2003 | Sinex |
| 6,691,064 B2 | 2/2004 | Vroman |
| 6,781,968 B1 | 8/2004 | Colella |
| 6,789,007 B2 | 9/2004 | Ellis |
| 6,795,758 B2 | 9/2004 | Sinex |
| 6,810,406 B2 | 10/2004 | Schlabach |
| 6,842,713 B1 | 1/2005 | Hutmacher-patel |
| 6,850,869 B2 | 2/2005 | Pierro |
| 6,868,319 B2 | 3/2005 | Kipersztok-weston |
| 6,885,921 B1 | 4/2005 | Farmer |
| 6,901,318 B1 | 5/2005 | Morronigiello |
| 6,901,377 B1 | 5/2005 | Rosenfeld |
| 6,907,416 B2 | 6/2005 | Tasooji |
| 6,996,498 B2 | 2/2006 | Pierro |
| 7,035,585 B2 | 4/2006 | Forman |
| 7,039,509 B2 * | 5/2006 | Podowski .................... 701/33.4 |
| 7,054,822 B2 | 5/2006 | Mccall |
| 7,068,301 B2 | 6/2006 | Thompson |
| 7,076,532 B2 | 7/2006 | Craik |
| 7,103,456 B2 * | 9/2006 | Bloch et al. ...................... 701/3 |
| 7,110,758 B2 | 9/2006 | Uchino |
| 7,149,612 B2 * | 12/2006 | Stefani et al. ............... 701/31.9 |
| 7,155,321 B2 | 12/2006 | Bromley |
| 7,167,788 B2 | 1/2007 | Loda |
| 7,171,372 B2 | 1/2007 | Daniel |
| 7,201,290 B2 | 4/2007 | Mehus |
| 7,209,814 B2 | 4/2007 | Kipersztok |

(Continued)

*Primary Examiner* — Jonathan M Dager
(74) *Attorney, Agent, or Firm* — Donna P. Suchy; Daniel M. Barbieri

(57) ABSTRACT

The present invention includes system and methods for managing information systems on an aircraft through the use of a remote management center. At the management center, the status information from aircraft computer systems is monitored for fault conditions. The management center then performs maintenance on the computer system when a fault condition is noticed. Exemplary systems include a remote management center that manages several different computer systems on several different manned aircraft. The management center connects to the aircraft and computer system through data links.

1 Claim, 1 Drawing Sheet

U.S. PATENT DOCUMENTS

| | | | |
|---|---|---|---|
| RE39,618 E | 5/2007 | Levine | |
| 7,230,527 B2 | 6/2007 | Basu | |
| 7,266,515 B2 | 9/2007 | Costello | |
| 7,269,482 B1 | 9/2007 | Shultz-hajj | |
| 7,328,012 B2* | 2/2008 | Ziarno et al. | 455/431 |
| 7,386,436 B2 | 6/2008 | Beck | |
| 7,410,623 B2 | 8/2008 | Mehus | |
| 7,437,225 B1* | 10/2008 | Rathinam | 701/14 |
| 7,450,901 B2 | 11/2008 | Parkman | |
| 7,451,023 B2* | 11/2008 | Appleby et al. | 701/24 |
| 7,483,695 B2 | 1/2009 | Uchino | |
| 7,487,013 B2 | 2/2009 | Miklos | |
| 7,558,701 B2* | 7/2009 | Andarawis et al. | 702/183 |
| 7,561,037 B1* | 7/2009 | Monroe | 340/521 |
| 7,564,347 B2* | 7/2009 | Hansen | 340/539.13 |
| 7,904,081 B2* | 3/2011 | Graves et al. | 455/431 |
| 7,904,082 B2* | 3/2011 | Graves et al. | 455/431 |
| 2002/0004698 A1* | 1/2002 | Lai | 701/120 |
| 2003/0027551 A1* | 2/2003 | Rockwell | 455/410 |
| 2003/0065428 A1* | 4/2003 | Mendelson et al. | 701/9 |
| 2003/0067542 A1* | 4/2003 | Monroe | 348/148 |
| 2003/0069015 A1* | 4/2003 | Brinkley et al. | 455/431 |
| 2003/0078050 A1* | 4/2003 | Carlborg et al. | 455/452 |
| 2003/0083794 A1* | 5/2003 | Halm et al. | 701/29 |
| 2003/0158744 A1* | 8/2003 | Moitra et al. | 705/1 |
| 2003/0195675 A1* | 10/2003 | Felke et al. | 701/29 |
| 2003/0225492 A1* | 12/2003 | Cope et al. | 701/35 |
| 2003/0236854 A1* | 12/2003 | Rom et al. | 709/217 |
| 2004/0160340 A1* | 8/2004 | Thomson et al. | 340/945 |
| 2005/0149238 A1* | 7/2005 | Stefani et al. | 701/33 |
| 2005/0154507 A1* | 7/2005 | Pierro et al. | 701/19 |
| 2005/0171651 A1* | 8/2005 | Loda et al. | 701/2 |
| 2005/0228558 A1* | 10/2005 | Valette et al. | 701/33 |
| 2006/0114324 A1* | 6/2006 | Farmer et al. | 348/144 |
| 2006/0122925 A1* | 6/2006 | Wesby | 705/35 |
| 2006/0184291 A1* | 8/2006 | Paradis et al. | 701/23 |
| 2006/0218285 A1* | 9/2006 | Talwar et al. | 709/227 |
| 2007/0001830 A1* | 1/2007 | Dagci et al. | 340/438 |
| 2007/0027589 A1* | 2/2007 | Brinkley et al. | 701/3 |
| 2007/0111725 A1* | 5/2007 | Kauffman et al. | 455/431 |
| 2007/0115938 A1* | 5/2007 | Conzachi et al. | 370/352 |
| 2007/0130599 A1* | 6/2007 | Monroe | 725/105 |
| 2007/0206545 A1* | 9/2007 | Lee et al. | 370/338 |
| 2007/0260726 A1* | 11/2007 | Rozak et al. | 709/224 |
| 2007/0291780 A1* | 12/2007 | Smith et al. | 370/411 |
| 2008/0313037 A1* | 12/2008 | Root et al. | 705/14 |
| 2009/0259361 A1* | 10/2009 | Tuff | 701/33 |
| 2010/0013628 A1* | 1/2010 | Monroe | 340/539.18 |

* cited by examiner

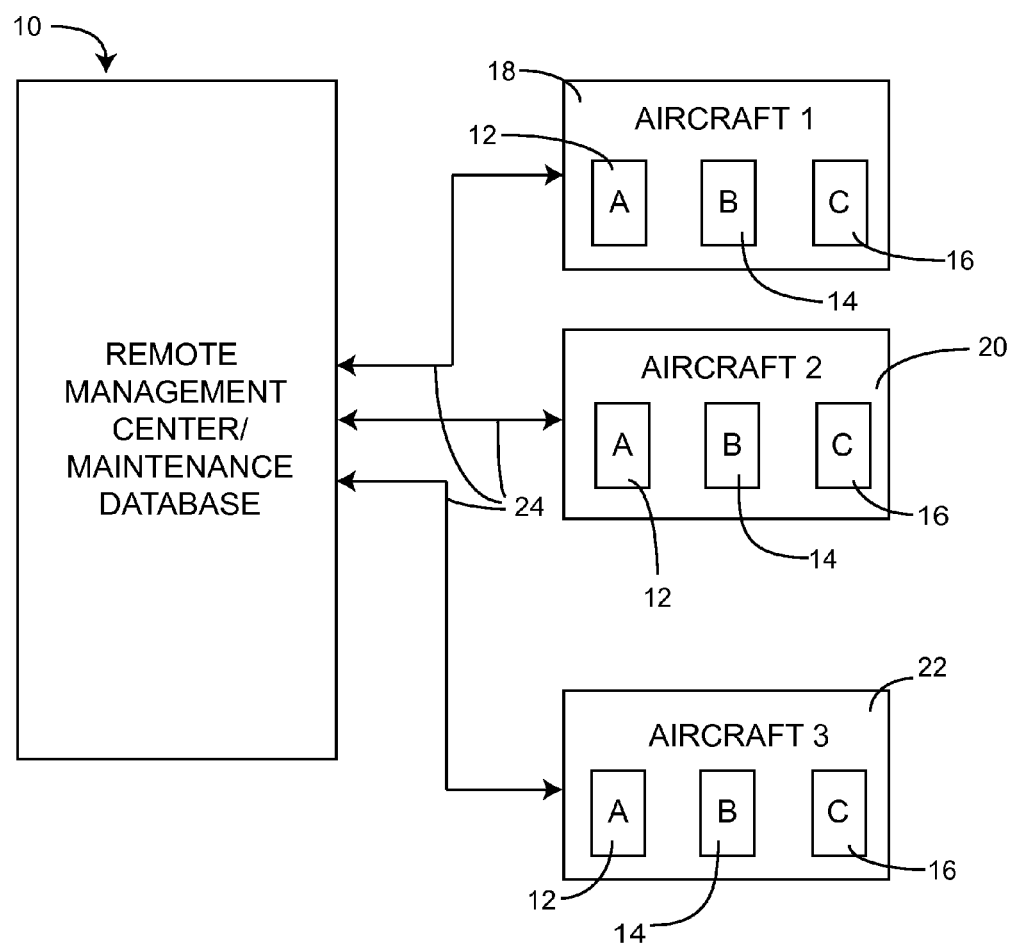

REMOTE MANAGEMENT OF AIRCRAFT COMPUTER SYSTEMS

FIELD OF THE INVENTION

The present invention relates to systems and methods for remotely managing the computer systems on aircraft.

BACKGROUND OF THE INVENTION

Today's passenger, business and military aircraft are essentially flying computer farms, as computers are involved in almost every aspect of the aircraft and every phase of flight. From the communication and navigation systems to the in-flight entertainment systems, computers are necessary for safe and comfortable flights. Indeed, most aircraft are un-flyable without the aid of computers.

However, all of this computer equipment requires upkeep and maintenance. Access and expertise are both significant issues in providing this maintenance. For security reasons, when it is on the ground, physical access to the aircraft is limited. Obviously, when in-flight, physical access is even more limited. Those with access are not necessarily those with the expertise in performing this maintenance. Pilots are focused on maintaining safe flight operations, while flight attendants are focused on maintaining the safety and comfort of passenger. Moreover, security of computer systems remains a high priority because of the reliance place on the computers.

The present invention overcomes one or more of these problems.

SUMMARY OF THE INVENTION

The present invention includes systems and methods for managing information systems on an aircraft through the use of a remote management center. At the management center, the status information from aircraft computer systems is monitored for fault conditions. The management center then performs maintenance on the computer system when a fault condition is noticed. Exemplary systems include a remote management center that manages several different computer systems on several different manned aircraft. The management center connects to the aircraft and computer system through data links.

BRIEF DESCRIPTION OF THE DRAWINGS

In the drawings:
FIG. 1 schematically shows a remote management system.

DETAILED DESCRIPTION

The present invention includes systems and methods for the remote management of computer systems on aircraft. As used herein, management refers to the monitoring and performing maintenance on the computer systems of the aircraft. Management does not refer to control of the flight operations of the aircraft. Flight operations remain the responsibility of the pilot or other systems beyond the scope of this invention, although this invention could be used in combination with a remote controlled or autonomous flight operations system.

As seen in FIG. 1, the system includes a remote management center 10 for managing a plurality of aircraft computer systems 12, 14, 16 on a plurality of aircraft under supervision 18, 20, 22, wherein the remote management center is connected to the aircraft or aircraft computer system by a data link 24.

The methods include monitoring status information received from each of a plurality of aircraft computer systems at a remote management center. The monitoring includes comparing the status information to a maintenance database. Monitoring also includes performing maintenance on the aircraft computer system upon the discovery of a fault condition.

The aircraft under supervision are the aircraft that are having their computer systems monitored by the remote management center. Suitable aircraft include all passenger, cargo and military aircraft, whether fixed or rotary winged and include planes, jets, turboprops, helicopters and the like. The present invention is preferably utilized in combination with manned aircraft because of the desire to relieve human pilots and flight attendants of the responsibility for monitoring and performing maintenance on aircraft computer systems, although its use with unmanned aircraft is also contemplated.

Each aircraft may have one or more computer systems being managed by the remote management center and typically includes both software and hardware. For example, software utilized on general purpose hardware is contemplated as a computer system capable of being remotely managed. Also, hardware with embedded software may be managed by changing its embedded software. Each computer system on the aircraft suitable for management includes navigation systems, flight control systems, communications systems, propulsion systems, payload (cargo or weapons) management systems, emergency systems, data recording and reporting systems, climate control systems, entertainment systems, etc.

The data link between the remote management center and the aircraft may be a wireless or wireline connection to the aircraft per se (e.g. a network contained within the aircraft) or to one more of the aircraft computer systems within the aircraft. The data link within the aircraft may be wireless or wireline. The data link may necessarily be part of some of the managed computer systems because communications is a fundamental task for that system. For other computer systems, data links are optionally apart of the system. In the alternative, a data link may be shared among several or all of computer systems on the aircraft. It is also contemplated that several data links may be chained to together in order to connect a computer system to the remote management center. For example, a wireless connection may be made from the remote management center to a receiver on the aircraft and a wireline connection may connect the receiver to a computer system (e.g. the entertainment system) on the aircraft.

Any number and combination of protocols may be used in the data link including WiFi, WiMax, TCP/IP, GSM, TDMA, CDMA, other cellular protocols, wide band, ultrawide band, microwave and RF. Indeed, a plurality of protocols is desired so as to ease communication with each of the different aircraft computer systems, as well as at global communications networks, whether public or private, secure or open.

The remote management system is responsible for managing the aircraft computer systems. Management includes monitoring and performing maintenance on the aircraft computer systems.

The remote management center is located away from the aircraft. While typically ground based, the remote management center may be located on another aircraft, a ship, a train or other transportation vehicle. The remote management center provides a location from which the computer systems on the aircraft can be managed. The remote management center is centralized in that many aircraft dispersed around the world may be managed by a single person or single group of people. However, the remote management center may have its components or functionality spread across different physical locations, with the locations connected by one or more data links. This provides redundancy and security from a localized problem or disaster. Stated alternatively, a network of remote management nodes may make up the remote management center.

The remote management center comprises hardware and software tools useful in providing real time management of aircraft computer systems. Typical hardware tools include workstations, servers, and networking and other communications equipment, as well as monitoring and control equipment. The networking and communications equipment includes transmitters, receivers and transceivers needed to provide one half of the data link with the aircraft or aircraft computer systems.

Software tools include operating systems, programs, source code, scripts, as well as a maintenance database containing current and historical maintenance data for each of the aircraft computer systems in each of the aircraft under supervision, including the version of software utilized or available for each of the computer systems. The maintenance database may include more generalized information concerning the hardware and software utilized in the aircraft computer systems, such as maintenance bulletins, security alerts, and conflicts with other software, hardware or communications protocols, whether provided by the hardware or software vendor, a third party or the operators of the remote management center. The maintenance database may also contain information about appropriate scheduling of maintenance.

Monitoring by the remote management center includes receiving status information from the aircraft computer system. The status information being communicated includes general status information regarding the health and condition of the computer system and associated systems (e.g., data links); for example, whether a normal or fault condition exists. Also, some computer systems generate error codes that are helpful in diagnosing and remedying problems with the computer system. The status information may also indicate whether the computer system or aircraft is able to carry out an assigned task; for example, whether the aircraft is able to fly over water based on regulations or procedures. The status information may also identify the version of hardware or software being utilized by the aircraft computer system. Also, monitoring includes the recognition that a scheduled report of status information has not been made.

Monitoring also includes analyzing the received status information for an indication of a problem with the aircraft computer system. This is typically done by comparing the received information against information in the maintenance database. Where no difference between the received information and the maintenance database information is found, the database may be updated to reflect that the status check had been complete and no fault condition was found. For example, when a fleet wide evaluation of the software used in the entertainment system is conducted, some systems will have the most current version of the software. No fault condition will be generated for these systems, and the maintenance database will be updated to reflect the fact that entertainment system software on that aircraft is current. In addition, analysis or comparison may be against other platforms in the fleet (e.g., performance compared with similar aircraft) or against a third party provided standard (e.g., Required Navigation Performance). Indeed, analysis and comparison may be carried out against any internal standard (e.g. a database) or external standard (e.g. industry standards, regulations or required performance metrics) applicable to the system being analyzed.

Where a difference between the received information and the maintenance database information exists, the database may be updated to reflect that a fault had been found. A fault may be an indication that the computer system is not working, needs to be upgraded, needs to be configured or otherwise maintained or installed. Fault conditions may be the result of proactive or reactive information in the maintenance database. Proactive information may be an indication that an updated version of the software is available or that new software needs to be installed. Reactive information may be information on what steps to take when the computer system generates certain error codes.

Each fault condition is assigned a priority status. The priority status is an indication of what the fault is and when the fault needs to be corrected. Faults with emergency priority require immediate correction, while scheduled priority may require correction at the next ground maintenance opportunity. For example, some upgrades are low priority and thus should be completed when the aircraft is otherwise out of service, while some repair operations are critical to the continued safe operation of the aircraft in-flight and thus may be completed in-flight.

Moreover, each fault may create a lockout such that the fault must be corrected before other changes in the computer system can take place, before faults on sister computer systems in the aircraft can be corrected or before other changes in sister computer systems can be made. For example, a fault on an in-flight safety system may lock out corrections on an entertainment system to insure that the issue with the safety system is addressed first or to insure that a correction to the entertainment system does not conflict with the needed maintenance on the safety system. Faults may also be recorded to generate trend information that may be later analyzed.

The monitoring of the aircraft computer system may be continuous or intermittent with monitoring taking place at specific time intervals, at specific flight stages or at specific geographic locations. For example, the monitoring may take place every second, every 30 seconds, every minute, every 10 minutes, every hour or every day, week, month or year. In the alternative, the monitoring may take place during pre-flight, takeoff, in-flight, landing, post-flight or during staging of the plane. Also, monitoring may take place when the aircraft enters or exits specific geographic zones, such as a given radius around the remote management center or a key location (e.g., an airport or a metropolitan area), a certain altitude, a certain set of geographic coordinates, or a certain percentage from the beginning or end of the scheduled flight plan.

The management by the remote management center includes performing maintenance on the aircraft computer system, including correcting previously identified faults with the computer systems; preventative maintenance is also contemplated. Maintenance includes installing, configuring, repairing, removing, replacing, upgrading or otherwise changing the software utilized by the aircraft computer system in the performance of its functions. Maintenance includes uploading software to the aircraft computer system from the remote management center and executing that software on the aircraft computer system. Maintenance also includes executing commands, remotely or locally, on the aircraft computer system to execute software or to change configuration of the executed software.

The performance of maintenance may take place at anytime, but preferably during periods when the aircraft computer system is not critical to the continued safe operation of the aircraft (e.g., when the aircraft is parked or otherwise not being flown). However, there may be situations where it is desirable or critical that maintenance be performed immediately. For example, during emergency situations, maintenance may be performed immediately. Likewise, maintenance may be performed immediately and preemptively in order to prevent situations from becoming emergencies.

Another benefit of the remote management center is that the computer systems of the aircraft can be locally secured such that access to onboard computer systems is extremely limited. Because onboard personnel do not need access to the computer systems to perform maintenance, such access need not be provided at all. By eliminating onboard access, the overall security of the aircraft computer systems is improved.

In another example, the system is useful in maintaining a fleet of aircraft that is owned by a number of different organizations (e.g., corporations or individuals) that are located around the world. There is a likelihood that there would be single communication standard, and it is unlikely that the aircraft would be in the same phase of flight or operation at the same time. This system provides the ability to identify a problem in a single remote platform, isolate the cause and upload a fix to that platform, and then all other platforms which might have the same problem could be fixed in a timely and efficient manner, while also having detailed records of the updates.

It will be further appreciated that functions or structures of a plurality of components or steps may be combined into a single component or step, or the functions or structures of one-step or component may be split among plural steps or components. The present invention contemplates all of these combinations. Unless stated otherwise, dimensions and geometries of the various structures depicted herein are not intended to be restrictive of the invention, and other dimensions or geometries are possible. Plural structural components or steps can be provided by a single integrated structure or step. Alternatively, a single integrated structure or step might be divided into separate plural components or steps. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention. The present invention also encompasses intermediate and end products resulting from the practice of the methods herein. The use of "comprising" or "including" also contemplates embodiments that "consist essentially of" or "consist of" the recited feature.

The explanations and illustrations presented herein are intended to acquaint others skilled in the art with the invention, its principles, and its practical application. Those skilled in the art may adapt and apply the invention in its numerous forms as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes.

What is claimed is:

1. A method of managing information systems on an aircraft, comprising:

monitoring, at a remote management center, status information from a plurality of aircraft computer systems for a plurality of fault conditions;

while inflight, performing maintenance on the aircraft computer system having a fault condition to return the aircraft computer system to a normal condition; wherein the monitoring step comprises:

receiving the status information from a plurality of aircraft computer systems;

analyzing the received status information to determine whether a normal or fault condition exists for each aircraft computer system; and updating a maintenance database with information indicating the condition of each of the aircraft computer systems;

wherein the analyzing step comprises:

comparing the received status information to information stored in the maintenance database;

generating a fault condition if the received status information does not match the database information or generating a normal condition if the received status information does match the database information; and assigning for each fault condition a priority status which indicates what the fault condition is and when in must be corrected;

wherein the performing maintenance step comprises correcting previously identified fault conditions in an order dependent upon said priority status;

wherein the correcting step comprises one of installing, configuring, repairing, removing, replacing, upgrading, otherwise changing software while said aircraft is inflight and where said correcting step is responsive to a highest priority status; and wherein the aircraft is a manned aircraft and wherein each fault condition generates a lockout status for all correcting steps which have a lower priority status.

* * * * *